United States Patent [19]
Farcasiu et al.

[11] Patent Number: 5,721,186
[45] Date of Patent: Feb. 24, 1998

[54] METHOD FOR PRODUCING CATALYSIS FROM COAL

[75] Inventors: Malvina Farcasiu, Pittsburgh, Pa.; Frank Derbyshire, Lexington, Ky.; Phillip B. Kaufman, Library, Pa.; Marit Jagtoyen, Lexington, Ky.

[73] Assignee: The United States of America as represented by the United States Department of Energy, Washington, D.C.

[21] Appl. No.: 708,991

[22] Filed: Sep. 6, 1996

[51] Int. Cl.$^6$ ................................. B01J 21/18
[52] U.S. Cl. ................. 502/184; 502/416; 502/417; 502/180; 502/182
[58] Field of Search ................. 502/416, 417, 502/180, 182, 184

[56] References Cited

U.S. PATENT DOCUMENTS

| | | | |
|---|---|---|---|
| 3,817,874 | 6/1974 | Wenneberg et al. | 252/445 |
| 3,833,514 | 9/1974 | Wenneberg et al. | 252/422 |
| 4,082,894 | 4/1978 | Wennergerg | 252/444 |
| 4,092,125 | 5/1978 | Stambaugh et al. | 44/1 R |
| 4,551,155 | 11/1985 | Wood et al. | 48/197 R |
| 5,369,214 | 11/1994 | Farcasiu | 585/469 |

OTHER PUBLICATIONS

Journal of Catalysis 146, 313–316 (1994).—No Month.
Coal Science, Proceedings of the Eighth International Conference on Coal Science, vol. II, 1303–1306 (1995)—No Month.

Primary Examiner—Walter D. Griffin
Assistant Examiner—Nadine Preisch
Attorney, Agent, or Firm—Lisa M. Golke; Mark P. Dvorscak; William R. Moser

[57] ABSTRACT

A method for producing catalysts from coal is provided comprising mixing an aqueous alkali solution with the coal, heating the aqueous mixture to treat the coal, drying the now-heated aqueous mixture, reheating the mixture to form carbonized material, cooling the mixture, removing excess alkali from the carbonized material, and recovering the carbonized material, wherein the entire process is carried out in controlled atmospheres, and the carbonized material is a hydrocracking or hydrodehalogenation catalyst for liquid phase reactions. The invention also provides for a one-step method for producing catalysts from coal comprising mixing an aqueous alkali solution with the coal to create a mixture, heating the aqueous mixture from an ambient temperature to a predetermined temperature at a predetermined rate, cooling the mixture, and washing the mixture to remove excess alkali from the treated and carbonized material, wherein the entire process is carried out in a controlled atmosphere.

12 Claims, 1 Drawing Sheet

1

METHOD FOR PRODUCING CATALYSIS FROM COAL

BACKGROUND OF THE INVENTION

1. Field of the Invention

This invention relates to a method for producing catalysts for conversion of hydrocarbons and halogenated hydrocarbons, and more specifically this invention relates to a method for treating coal to produce carbon-based catalysts for use in dehalogenation and hydrocracking reactions.

2. Background of the Invention

Many environmental cleaning and remediation processes utilize carbon materials as catalysts for certain reactions. These reactions include dehalogenation and hydrodehalogenation mechanisms. Two basic approaches exist in this type of halogen removal: The first approach is a complete gas-phase catalytic oxidation of halogen-containing compounds to produce carbon dioxide and the corresponding halogen-containing acid.

The second approach is catalytic dehalogenation which keeps the dehalogenated parent compound intact. Catalytic dehydrohalogenation reactions are performed in the liquid phase and as such, the molecular weight of compounds that are to be dehalogenated can be higher than those compounds dehalogenated in the gas-phase catalytic oxidation processes, noted supra.

Carbon blacks have been used in conversion processes. An exemplary method for catalytic hydrodehalogenation of halogenated aromatic compounds has been disclosed by one of the applicants in U.S. Pat. No. 5,369,214. However, only very modest dehalogenation rates (approximately 5–12 percent) are obtained when carbon black materials are used to convert halogen-substituted benzene products. These low conversions are obtained even when high surface area (i.e., 1300 $m^2/g$ to 1500 $m^2/g$) carbon blacks are utilized.

A need exists in the art for a method for producing catalysts from coal that can be used in an economical process of dehalogenation and hydrocracking of hydrocarbons. The use of relatively low temperatures in the production of these catalysts would be a hallmark for such an economical process. Also, the production of these catalysts would occur in a minimum number of steps using widely available reagents.

SUMMARY OF THE INVENTION

It is an object of the present invention to provide a method for producing hydrocracking and dehalogenation catalysts that overcomes many of the disadvantages of the prior art.

Another object of the present invention is to provide an economical method for producing hydrocracking and dehalogenation catalysts. A feature of the invention is the use of relatively low temperatures and widely available reagents to produce catalytic material from coal. An advantage of the invention is providing a catalyst capable of high dehalogenation rates of halogen-substituted benzene compounds.

Yet another object of the present invention is to provide catalysts with high activities and selectivities for various types of reactions. A feature of the invention is the production of a catalyst using widely available coal and common chemical feed stocks. An advantage of the invention is a low cost procedure to tailor a variety of catalysts for conversion of specific classes of compounds.

Briefly, the invention provides for a method for producing catalysts from coal comprising supplying a first controlled atmosphere; mixing an alkali with the coal in said first controlled atmosphere to create a mixture; heating the mixture in said first controlled atmosphere to treat the coal; drying the now-heated mixture to remove water from the treated coal; reheating the mixture in a second controlled atmosphere; cooling the mixture; and washing the mixture to remove excess alkali from said treated coal.

The invention also provides for a method for producing catalysts from coal comprising supplying a controlled atmosphere; mixing an alkali with the coal in said controlled atmosphere to create a mixture; heating the mixture in said controlled atmosphere to carbonize the coal; cooling the carbonized coal in said controlled atmosphere; and removing excess alkali from the carbonized coal.

BRIEF DESCRIPTION OF THE DRAWING

The present invention together with the above and other objects and advantages may best be understood from the following detailed description of the embodiment of the invention illustrated in the drawings, wherein.

DETAILED DESCRIPTION OF THE INVENTION

Figure 1:
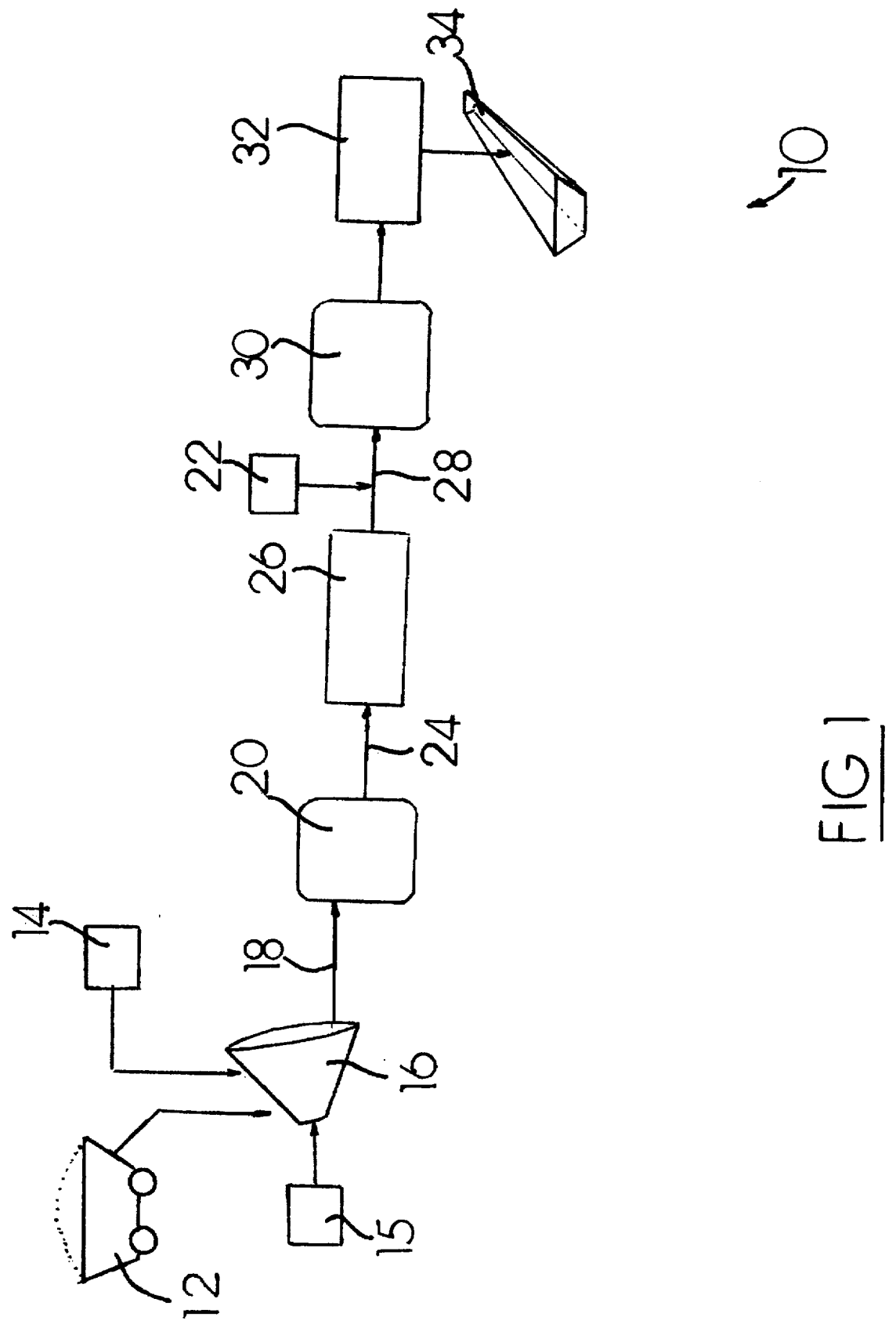
FIG. 1 is a schematic diagram of a two-step heating process to produce catalysts from coal, in accordance with the present invention.

A method to prepare various catalysts from coal in the presence of alkaline hydroxides has been invented. Surprisingly and unexpectedly, the inventors have found that under very defined preparation conditions, carbon materials could be very active hydrocracking and hydro-dehalogenation catalysts, particularly for substituted aromatic compounds. Exemplary target compound classes include alkyl-aromatic hydrocarbons containing at least one condensed aromatic moiety, halogenated condensed aromatic compounds, and halogenated mono-aromatic compounds. The inventors have found that once the catalysts are prepared, they are very stable, maintaining their catalytic activity for many months, under normal storage conditions.

Several process parameters must be controlled in the invented method to produce the high efficiency and specificity catalysts illustrated infra. These parameters are as follows:

1.) Rank of coal;
2.) Method and conditions of coal cleaning;
3.) Maintaining a controlled gas atmosphere during each step of the entire process; and
4.) Final treatment temperature.

The preparation of these catalytic materials is either a one- or two-step process. The two-step heating process for preparing the catalyst is depicted in FIG. 1 as numeral 10. Briefly, coal 12 (either run-of-mine or demineralized) is first contacted with a solution of alkaline hydroxide 14, such as sodium hydroxide, potassium hydroxide, magnesium hydroxide, calcium hydroxide, or combinations thereof. The hydroxide and coal is thoroughly combined in a mixer 16 at a predetermined temperature such as ambient temperature for a predetermined period of time in a controlled gas atmosphere. The resulting mixture 18 is directed to a first means for heating 20 in the controlled atmosphere. The controlled atmosphere is introduced at the beginning of the process via a supply 15 of a selected gas.

After heating for an effective period of time, the post-heated mixture 24 is subjected to a means for drying 26 or dehydrating the mixture, leaving the alkali-treated coal. The treated coal 28 is directed to a second means for heating 30, then later subjected to a cooling process 32 and a washing step 34. Depending on the catalyst to be produced, a second controlled atmosphere could be established in the system via a second supply 22 of a selected gas. The second supply could feed into the process just prior to the second heating step 30, and could be used to modify the first controlled atmosphere.

Surprisingly and unexpectedly, the inventors have found that modification of the reaction atmosphere in the first heating step 20 and the second heating step 30 result in substantial variations of catalytic activity and selectivity in the resulting catalyst. These variations are clearly illustrated in examples 6 and 7, infra.

The importance of the highest treatment temperature, (i.e., the second heating step 30) is illustrated in the data presented in examples 2 and 3, infra, for potassium hydroxide-activated coals, and in example 14 for sodium hydroxide-activated coals.

The importance that the method of coal cleaning has on the catalytic activity and selectivity of resulting catalysts is illustrated in example 8. Example 8 suggests that a coal cleaning process performed under inert atmosphere (nitrogen here, but also argon and helium are suitable) may result in the production of catalysts that are particularly effective for reactions of hydrocracking and dehalogenation of halogenated mono-aromatic compounds.

As illustratd in Table 1, infra, a variety of catalysts were synthesized from subbituminous and bituminous coals.

TABLE 1

Composition of Coals Used as Catalyst Precursors

| No. | Coal | Element Composition maf (%) | | | | Ash (mf) % |
|---|---|---|---|---|---|---|
| | | C | H | N | S | |
| 1. | Black Thunder* | 75.6 | 6.7 | 1.0 | 0.6 | 5.8 |
| 2. | Sunnyside, SA | 82.9 | 7.1 | 1.8 | 0.6 | 2.5 |
| 3. | Pittsburgh #8* | 86.2 | 5.4 | 1.2 | 1.3 | 7.3 |
| 4. | Indiana VII SA | 80.8 | 6.6 | 1.8 | 0.6 | 2.7 |
| 5. | Indiana VII MC | 81.8 | 5.3 | 1.8 | 0.6 | 2.7 |
| 6. | Indiana VII* | — | — | — | — | 9.2 |

*coal used-as received for catalyst preparation.
SA - coal cleaned by solvent agglomeration.
MC - coal cleaned by microcell method.
maf - moisture ash free.
mf - moisture free.

Examples 2–7, 9, 12 and 13 illustrate the influence of coal rank on catalytic activity. However, other coals of higher or lower rank, especially lignites, are suitable carbon feedstocks.

A typical chemical activation procedure involved mixing a solution of 42.6 grams of alkaline hydroxide in 100 milliliters of water with 30 grams of −100 mesh coal. (In this typical procedure, the weight ratio of the alkali to coal is approximately 1.4:1, but suitable catalyst are obtained when a weight ratio of alkali to coal selected from 0.5:1 to 5:1 is used). Mixing occurs under controlled gas atmosphere.

In the two-step heat treatment process, the mixture is heated to 75° C. for two hours, under a controlled gas composition atmosphere (a relatively inert gas containing nitrogen, argon, helium, or a mixture thereof is suitable). A reactor which allows for continuous stirring is suitable. The mixture is then dried over night (up to approximately 20 hours) at 100° C. to 125° C., preferably at 115° C. to 120° C. The drying step 26 is followed by the second heat treatment step 30 whereby the mixture is subjected to a final temperature of between approximately 700° C. to 1,000° C., also under a controlled gas composition atmosphere, for between approximately 0.5 and 4 hours, and preferably 1 to 2 hours, or until adequate carbonization occurs.

In the one-step catalyst preparation procedure, the same amounts of starting materials as in the above-procedure are first mixed at room temperature for one hour under a controlled gas atmosphere, then, then heated under the same controlled atmosphere to the selected final temperature ranging from between approximately 700° C. and 1,000° C. Heating time depends on the chosen heating rate, one suitable rate being approximately 10° C. per minute. Examples of catalysts produced by the one-heating-step process, and their activities, are illustrated in examples 10 and 11, below.

After cooling, all products are leached with distilled water to neutral to remove excess water soluble alkaline materials.

Three reactions (Reactions A, B and C), depicted infra, were used to test the catalytic activity of the new materials.

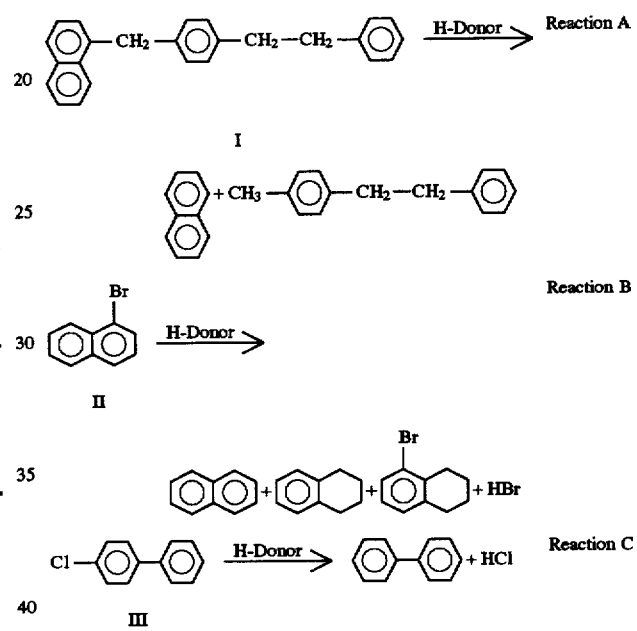

Reaction A, depicts hydrocracking, which is the selective cleavage of the bond between an aliphatic carbon and a condensed aromatic ring. The model compound used was 4-(1-naphthylmethyl) bibenzyl, designated as I in Reaction A.

Reaction B depicts hydrodehalogenation of halogenated condensed aromatic compounds. The model compound used was 1-Br-naphthalene, designated as II in Reaction B.

Reaction C depicts hydrodehalogenation of halogenated aromatic compounds with the halogen substituted on a benzenic ring. The model compound used was 4-Cl-biphenyl, designated as III in Reaction C.

The reactions wherein the invented catalysts were tested were all performed in sealed glass tubes, in the presence of the hydrogen donor 9, 10 dihydrophenanthrene (DHP). The weight ratio of the model compound to the hydrogen donor was 1:4. For the catalytic reactions, the weight ratio of model compound to catalyst was 10:1. The reaction time was one hour.

The various conversion rates enumerated in the examples below are average values of two or more tests.

EXAMPLE 1

A high surface area carbon black from Cabot BP2000 (surface area 1475 m²/g), an activated carbon from Calgon WS-4 (surface area ≈1300 m²/g), and a catalyst (BTC) prepared from a subbituminous coal (Black Thunder) by KOH activation under nitrogen in two steps (75° and 900° C.), were tested for their catalytic activity in the three reactions (A, B and C) described above. The following results were obtained:

| Catalyst | Conversion, % in reaction: | | | Surface area catalyst |
|---|---|---|---|---|
|  | A | B | C | m²/g |
| BP2000 | 44 | 29 | 5 | 1475 |
| WS-4 | 11 | 15 | 12 | 1300 |
| BTC | 67 | 63 | 71 | 2270 |

The new catalytic preparation depicts much more activity than the commercial carbons for all three reactions, even when the differences in surface area are considered.

EXAMPLE 2

To show the influence of the temperature in the second step, three catalysts were prepared from Black Thunder coal (#1, table 1) by the two step process described above. The catalytic activity for the three samples are illustrated below:

| HTT | Conversion, % in reaction: | | | Surface area catalyst |
|---|---|---|---|---|
| °C. | A | B | C | m²/g |
| 800 | 12 | 31 | 24 | 1209 |
| 900 | 67 | 63 | 71 | 2270 |
| 1000 | 1 | 18 | 30 | 45 |

The low temperature step was performed at 75° C. and the high temperature step at 800°, 900° and 1000° C., respectively. Both steps were performed under nitrogen for samples activated at 900° C. and 1000° C. For the sample activated at 800° C., the first step was performed in air and the second under nitrogen. The data demonstrate that the maximum catalytic activities were obtained at 900° C.

EXAMPLE 3

To show the influence of the temperature in the second step, three catalysts were prepared from Indiana VII SA coal (#4, table 1) by the two step process described above. The low temperature step was performed at 75° C. and the high temperature step at 800°, 900° C., and 1000° C. Both steps were performed under argon for the sample activated at 1000° C. For the other two samples, the first step was conducted under argon, the second under nitrogen. The samples were tested for their catalytic activity in the three reactions (A, B and C) described above.

For this bituminous coal, the catalytic activity is less sensitive to the second stage temperature than it is for the subbituminous coal in example 2. Nevertheless, a second step temperature of 900° C. provides the optimum activity for all three reactions. The following results were obtained:

| HTT | Conversion, % in reaction: | | | Surface area catalyst |
|---|---|---|---|---|
| °C. | A | B | C | m²/g |
| 800 | 40 | 40 | 18 | 1165 |
| 900 | 54 | 40 | 35 | 2180 |
| 1000 | 27 | 43 | 36 | 1729 |

EXAMPLE 4

To show the importance of the temperature in the first heating step, 20, two catalysts from Black Thunder coal were prepared. Both samples were prepared under nitrogen and using the same temperature (900° C.) for the second heating step, 30. The temperature of the first step was 75° C. and 400° C., respectively. The following results show that 400° C. initial heating temperatures are unnecessary to produce good catalysts.

| Temperature Step 1 | Conversion, % in reaction: | | | Surface area catalyst |
|---|---|---|---|---|
| °C. | A | B | C | m²/g |
| 75 | 67 | 63 | 71 | 2270 |
| 400 | 62 | 61 | 74 | 2093 |

The data show that 400° C. is unnecessary for good catalytic activity.

EXAMPLE 5

Like example 4, this example also shows the importance of the temperature in the first heating step 20. Precursors were derived from Indiana VII SA coal (#4, Table 1). Both samples were prepared under nitrogen and using the same temperature for step 2, 900° C. The temperature of the first step was 75° C. and 400° C., respectively.

For this bituminous coal, there is a modest gain in catalytic activity by conducting the first step at higher temperature, unlike the subbituminous coal in Example 4.

The following results were obtained:

| Temperature Step 1 | Conversion, % in reaction: | | | Surface area catalyst |
|---|---|---|---|---|
| °C. | A | B | C | m²/g |
| 75 | 42 | 48 | 26 | 2033 |
| 400 | 52 | 55 | 28 | 2409 |

EXAMPLE 6

This example illustrates the influence the composition of the atmosphere in the first and second heating steps has on the activity of the resulting catalysts. A subbituminous coal, Black Thunder, was used, and the temperatures of the two steps were 75° C. and 900° C., respectively.

The following results were obtained:

| Gas Composition | | Conversion % in reaction: | | | Surface area catalyst |
|---|---|---|---|---|---|
| Step 1 | Step 2 | A | B | C | m²/g |
| Argon | Argon | 41 | 38 | 37 | 1583 |
| Argon | Nitrogen | 57 | 61 | 71 | 1856 |
| Nitrogen | Nitrogen | 67 | 63 | 71 | 2270 |
| 2% Oxygen 98% N₂ | Nitrogen | 46 | 39 | 82 | 1664 |
| Nitrogen | 1.3% NH₃ 98.7% N₂ | 28 | 47 | 15 | 1703 |

For the subbituminous coal, the maximum catalytic activity for reactions A and B is attained when nitrogen is used in both stages. For reaction C, some further gain in activity is achieved by a small concentration of oxygen in step 1.

EXAMPLE 7

This example documents the influence of the composition of gas under which steps 1 and 2 are performed on the activity of catalysts obtained from a bituminous coal. The coal was Indiana VII SA and the temperatures of the two steps were 75° C. and 900° C., respectively. The following results for example 7 were obtained:

| Gas Composition | | Conversion % in reaction: | | | Surface area catalyst |
|---|---|---|---|---|---|
| Step 1 | Step 2 | A | B | C | m²/g |
| Argon | Nitrogen | 54 | 47 | 40 | 2180 |
| Nitrogen | Argon | 50 | 52 | 26 | 1938 |
| Nitrogen | Nitrogen | 42 | 48 | 26 | 2033 |
| 2% Oxygen 98% Nitrogen | Nitrogen | 20 | 51 | 43 | 1820 |
| Nitrogen | 1820 1.3% NH₃ 98.7% N₂ | 61 | 49 | 7 | 2180 |

The data from Example 7 depict two important findings: The first finding is that when even small quantities of oxygen are present in process step 1, hydrocracking activity (reaction A) of the resulting catalysts produce substantially reduced conversions. The second finding is that when oxygen-free nitrogen is used in step 1 of catalyst preparation, the resulting catalysts render substantially reduced hydrodehalogenation (Reaction C) conversions of halogenated mono-aromatic compounds.

EXAMPLE 8

This example illustrates the influence of the method of mineral matter reduction on the catalytic activity of carbons prepared from the same coal, Indiana VII. The temperature in the first step was 75° C., and in the second step, 900° C. Both steps were performed under nitrogen. Coal cleaned by three methods was compared to uncleaned coal. The three methods for coal cleaning were solvent agglomeration (SA), microcell flotation (MC), and triboelectrostatic separation (TE). The following results were obtained:

| Method for mineral matter removal | Conversion, % in reaction: | | | Surface area catalyst |
|---|---|---|---|---|
| | A | B | C | m²/g |
| None | 65 | 51 | 42 | — |
| SA | 42 | 48 | 26 | 2033 |
| MC | 49 | 58 | 30 | 1997 |
| TE | 18 | 57 | 11 | — |

EXAMPLE 9

This example illustrates that even for the same coal rank, the optimal preparation conditions could vary for various types of catalytic activity. Two subbituminous coals, Black Thunder (#1, table 1) and Sunnyside SA (#2, table 1) were KOH activated in two steps (75° and 900° C.), under nitrogen. While their surface area and their catalytic activity toward reactions A and B are similar, a significant difference in catalytic activity toward reaction C is observed.

The results are as follows:

| Coal | Conversion, % in reaction: | | | Surface area catalyst |
|---|---|---|---|---|
| | A | B | C | m²/g |
| Black Thunder | 67 | 63 | 71 | 2270 |
| Sunnyside | 64 | 50 | 25 | 2048 |

EXAMPLE 10

This example compares the effect of preparing the catalysts in a one-heating-step process versus a two-heating-step process. The catalysts compared in this example are prepared from Black Thunder coal (Table 1) under nitrogen. Sample #1 was prepared in two steps (75° and 900° C.), sample #2 was prepared in one step where the temperature was increased from room temperature to 900° C. at a rate of 10° C./min and maintained at the final temperature for 1 hour. The following results were obtained:

| Catalyst | Conversion, % in reaction: | | | Surface area catalyst |
|---|---|---|---|---|
| | A | B | C | m²/g |
| #1 | 67 | 63 | 71 | 2270 |
| #2 | 28 | 34 | 47 | 1530 |

While the two-step preparation gave consistently better results than the one-step preparation (at least under the described preparation conditions), the one-step catalysts are still better than the commercially available carbon materials described in Example 1.

EXAMPLE 11

This example also illustrates the effect of preparing the catalysts in a one-heating-step process versus in a two-heating-step process. The catalysts compared in this example are prepared from Indiana VII SA coal (Table 1) under nitrogen. Sample #1 was prepared in two steps (75° C. and 900° C.), sample #2 was prepared in one step where the temperature was increased from room temperature to 900° C. at a rate of 10° C./min and maintained at the final temperature for 1 hour. The following data was obtained:

| Catalyst | Conversion, % in reaction: | | | Surface area catalyst |
|---|---|---|---|---|
| | A | B | C | m²/g |
| #1 | 42 | 48 | 26 | 2033 |
| #2 | 21 | 43 | 22 | 1549 |

Similar data was obtained in example 10, except for reaction A where the single step product has lower activity than the BP2000 carbon black (see ex. 1).

EXAMPLE 12

This example illustrates the influence of the alkaline hydroxide used for the preparation of the catalysts. Two samples of Black Thunder subbituminous coal were activated using the two step procedure (75°/900° C.). Both steps were performed under nitrogen. One sample was activated with KOH, the other with NaOH. The material prepared by NaOH activation is a very good catalytic material and also obviously less expensive. The following catalytic activities were measured:

| Hydroxide used for activation | Conversion, % in reaction: | | | Surface area catalyst m²/g |
|---|---|---|---|---|
| | A | B | C | |
| KOH | 67 | 63 | 71 | 2270 |
| NaOH | 58 | 55 | 54 | 1483 |

EXAMPLE 13

This example illustrates the influence of the alkaline hydroxide used for the preparation of the catalysts. Two samples of Indiana VII SA bituminous coal were activated using the two step procedure (75°/900° C.). Both steps were performed under nitrogen. One sample was activated with KOH, the other with NaOH. The following catalytic activities were measured:

| Hydroxide used for | Conversion, % in reaction: | | | Surface area catalyst m²/g |
|---|---|---|---|---|
| | A | B | C | |
| KOH | 42 | 48 | 29 | 2033 |
| NaOH | 55 | 35 | 22 | 1847 |

In the case of this bituminous coal, the decrease of the surface area of the catalyst when prepared by activation with NaOH versus KOH is insignificant. The NaOH activated catalyst is comparable in activity with the KOH activated one, being even more active in the case of the hydrocracking reaction (A).

EXAMPLE 14

To show the influence of the temperature and of NaOH activation in the second step, three catalysts were prepared from Indiana VII SA coal (#4, table 1) by the two step process. The low temperature step was performed at 75° C. and the high temperature step at 800°, 900° and 1000° C., respectively. Both steps were performed under nitrogen in all cases.

The following data was collected:

| HTT °C. | Conversion, % in reaction: | | | Catalyst Surf. A. m²/g |
|---|---|---|---|---|
| | A | B | C | |
| 800 | 65 | 55 | 14 | 1566 |
| 900 | 55 | 35 | 22 | 1847 |
| 1000 | 35 | 32 | 4 | 1399 |

While the invention has been described with reference to details of the illustrated embodiment, these details are not intended to limit the scope of the invention as defined in the appended claims.

The embodiment of the invention in which an exclusive property or privilege is claimed is defined as follows:

1. A method for producing catalysts comprising;
   a.) cleaning coal;
   b.) supplying a first controlled atmosphere;
   c.) mixing an aqueous alkali solution with the cleaned coal in said first controlled atmosphere to create an aqueous mixture;
   d.) heating the mixture in said first controlled atmosphere to treat the coal;
   e.) drying the now-heated mixture to remove water from the treated coal;
   f.) reheating the mixture in a second controlled atmosphere to form carbonized material;
   g.) cooling the mixture in said second controlled atmosphere;
   h.) washing the mixture to remove excess alkali from the carbonized material; and
   i.) recovering the carbonized material, wherein the recovered material is both a hydrocracking catalyst and a dehalogenation catalyst for catalyzing the dehalogenation of halogenated mono-aromatic compounds.

2. A method for producing catalysts comprising:
   a.) cleaning coal;
   b.) supplying a controlled atmosphere;
   c.) mixing an aqueous alkali solution with coal in said controlled atmosphere to create a mixture;
   d.) heating the mixture from ambient temperature to a temperature between approximately 700° C. and 1,000° C. at a rate between approximately 1° C. per minute to 20° C. per minute in said controlled atmosphere to treat the coal and to form carbonized material;
   e.) cooling the mixture in said controlled atmosphere;
   f.) washing the mixture to remove excess alkali from the carbonized material; and
   g.) recovering the carbonized material, a catalyst.

3. The method as recited in claim 2 wherein the alkali is an alkaline hydroxide selected from the group consisting of potassium hydroxide, sodium hydroxide, calcium hydroxide, magnesium hydroxide and combinations thereof.

4. The method as recited in claim 3 wherein the alkaline hydroxide is mixed with the coal in an alkaline hydroxide to coal weight ratio selected from between approximately 0.5:1 and 5:1.

5. The method as recited in claim 2 wherein the controlled atmosphere is a gas selected from the group consisting of nitrogen, argon, helium, and combinations thereof.

6. A method for producing catalysts comprising:
   a.) supplying a first controlled atmosphere comprised of inert and non-inert gases;
   b.) mixing an aqueous alkali solution with coal in said first controlled atmosphere to create a mixture;
   c.) heating the mixture in said first controlled atmosphere to treat the coal;
   d.) drying the now-heated mixture to remove water from the treated coal;
   e.) reheating the mixture in a second controlled atmosphere comprised of inert and non-inert gases to form carbonized material;
   f.) cooling the mixture in said second controlled atmosphere;
   g.) washing the mixture to remove excess alkali from the carbonized material; and
   h.) recovering the carbonized material, a catalyst.

7. The method according to claim 6 wherein the inert gas is selected from a group consisting of nitrogen and argon.

8. The method according to claim 6 wherein the non-inert gas is selected from a group consisting of ammonia and oxygen.

9. The method according to claim 6 wherein the step of heating the mixture further comprises heating the mixture to a temperature within the range of between approximately 50° C. and 90° C. to treat the coal.

10. A method for producing catalysts comprising:
  a.) supplying a first controlled atmosphere containing oxygen and a gas selected from the group consisting of argon and nitrogen;
  b.) mixing an aqueous alkali solution with subbituminous coal in said first controlled atmosphere to create an aqueous mixture;
  c.) heating the mixture in said first controlled atmosphere to treat the coal;
  d.) drying the now-heated mixture to remove water from the treated coal;
  e.) reheating the mixture in a second controlled atmosphere containing a gas selected from the group consisting of argon and nitrogen to form carbonized material;
  f.) cooling the mixture in said second controlled atmosphere;
  g.) washing the mixture to remove excess alkali from the carbonized material; and
  h.) recovering the carbonized material, a hydrocracking catalyst.

11. A method for producing catalysts comprising:
  a.) supplying a first controlled atmosphere containing oxygen and a gas selected from the group consisting of argon and nitrogen;
  b.) mixing an aqueous alkali solution with coal in said first controlled atmosphere to create an aqueous mixture;
  c.) heating the mixture in said first controlled atmosphere to treat the coal;
  d.) drying the now-heated mixture to remove water from the treated coal;
  e.) reheating the mixture in a second controlled atmosphere containing a gas selected from the group of argon and nitrogen to form carbonized material;
  f.) cooling the mixture in said second controlled atmosphere;
  g.) washing the mixture to remove excess alkali from the carbonized material; and
  h.) recovering the carbonized material, a hydrodehalogenation catalyst for catalyzing the hydrodehalogenation of halogenated condensed aromatic compounds.

12. A method for producing catalysts comprising:
  a.) supplying a first controlled atmosphere containing oxygen and a gas selected from the group consisting of argon and nitrogen;
  b.) mixing an aqueous alkali solution with subbituminous coal in said first controlled atmosphere to create an aqueous mixture;
  c.) heating the mixture in said first controlled atmosphere to treat the coal;
  d.) drying the now-heated mixture to remove water from the treated coal;
  e.) reheating the mixture in a second controlled atmosphere containing a gas selected from the group consisting of argon and nitrogen to form carbonized material;
  f.) cooling the mixture in said second controlled atmosphere;
  g.) washing the mixture to remove excess alkali from the carbonized material; and
  h.) recovering the carbonized material, a hydrogenation catalyst for catalyzing the hydrodehalogenation of halogenated aromatic compounds with the halogen substituted on a benzenic ring.

* * * * *